(12) United States Patent
Chan

(10) Patent No.: US 6,523,175 B1
(45) Date of Patent: Feb. 18, 2003

(54) METHODS AND APPARATUS FOR IDENTIFYING THE SOURCE OF A USER SELECTED SIGNAL VIA AN INTERMEDIATE FREQUENCY PROBE

(75) Inventor: Cheuk Wan Chan, Tarpon Springs, FL (US)

(73) Assignee: Nielsen Media Research, Inc., Schaumburg, IL (US)

( * ) Notice: Subject to any disclaimer, the term of this patent is extended or adjusted under 35 U.S.C. 154(b) by 0 days.

(21) Appl. No.: 09/365,378

(22) Filed: Aug. 2, 1999

(51) Int. Cl.[7] .............................. H04N 9/00; H04N 7/16
(52) U.S. Cl. ..................... 725/15; 725/9; 725/10; 725/14; 725/19; 455/2.01
(58) Field of Search ................ 725/15, 19, 9–14; 455/2.01

(56) References Cited

U.S. PATENT DOCUMENTS

| | | | | |
|---|---|---|---|---|
| 2,892,885 A | | 6/1959 | Freeman ................. 178/5.8 |
| 3,803,349 A | | 4/1974 | Watanabe ............... 178/5.8 R |
| 4,027,332 A | * | 5/1977 | Wu et al. ................ 178/5.8 R |
| 4,044,376 A | | 8/1977 | Porter ........................ 358/84 |
| 4,633,495 A | * | 12/1986 | Schotz ......................... 381/3 |
| 4,697,209 A | | 9/1987 | Kiewit et al. ............... 358/84 |
| 4,723,302 A | * | 2/1988 | Fulmer et al. .............. 455/2 |
| 5,268,646 A | * | 12/1993 | Doss ......................... 324/633 |
| 5,425,100 A | | 6/1995 | Thomas et al. ............ 380/20 |
| 5,481,294 A | | 1/1996 | Thomas et al. ............. 348/1 |
| 5,495,282 A | | 2/1996 | Mostafa et al. ............. 348/5 |
| 5,594,934 A | | 1/1997 | Lu et al. ..................... 455/2 |
| 5,633,690 A | | 5/1997 | Eum ......................... 348/678 |
| 5,678,214 A | | 10/1997 | Azuma ..................... 455/217 |
| 5,889,548 A | | 3/1999 | Chan ........................... 348/4 |
| 6,124,877 A | * | 9/2000 | Schmidt ....................... 348/2 |

* cited by examiner

Primary Examiner—Bhavesh Mehta
Assistant Examiner—Son P. Huynh
(74) Attorney, Agent, or Firm—Katten Muchin Zavis Rosenman

(57) ABSTRACT

A non-invasive or minimally invasive intermediate frequency (I.F.) probe is disclosed for use as part of a broadcast audience measurement system. The probe can be used both to acquire a representation of a tuned signal and to inject a recognition signal into a tuned signal. The probe is configurable for use with both analog (e.g., NTSC, PAL or SECAM) and digital (e.g., ATSC) television broadcasts. Optionally, when in the injection mode, the I.F. probe can be used with another sensor;to determine which of several inputs to a monitored receiver is providing the audio and/or video output(s) selected by an audience member.

24 Claims, 5 Drawing Sheets

METHODS AND APPARATUS FOR IDENTIFYING THE SOURCE OF A USER SELECTED SIGNAL VIA AN INTERMEDIATE FREQUENCY PROBE

FIELD OF THE INVENTION

The invention relates generally to broadcast audience measurement, and, more particularly, to methods and apparatus for identifying the source of a signal selected by an audience member in a statistically selected dwelling unit via an intermediate frequency probe.

BACKGROUND OF THE INVENTION

It is well known that broadcast ratings (e.g., television and radio program ratings) are developed by companies such as Nielsen Media Research by monitoring the usage patterns of audience members in statistically selected homes. By developing accurate readings of the programs received by the members of theses homes, it is possible to develop similarly accurate indications of the size and demographic composition of the audience in general. To ensure the ratings developed are as accurate as possible, it is important to ensure accuracy in identifying the programs received by the monitored audience members. To ensure that the monitoring process does not inconvenience the monitored audience by requiring members to monitor their own usage, electronic monitoring of the signals received by the receivers of the audience members has long been preferred.

The use of a super-heterodyne tuner in which a user-selected local oscillator frequency is heterodyned with a received RF signal to generate a fixed-frequency band of tuned signals that is input to an intermediate frequency (hereinafter I.F.) amplifier has long been known in the radio signaling arts.

Watanabe, U.S. Pat. No. 3,803,349, discloses a television audience measurement system wherein successive sound I.F. signals taken from a monitored television receiver are compared with respective sound I.F. signals taken from a slaved television tuner of the measurement apparatus. Watanabe does not teach the use of video I.F. signals for making this comparison, nor does it disclose the use of a non-invasive probe or pick-up for acquiring an I.F. signal from the monitored receiver. Watanabe also fails to disclose a method or apparatus for injecting an I.F. recognition signal into the monitored receiver.

Azuma, U.S. Pat. No. 5,678,214, and Eum, U.S. Pat. No. 5,633,690, disclose arrangements for adjusting the levels of I.F. signals in a receiver.

Those in the field of broadcast audience measurement have long realized the advantages of making tuning measurements on a sampled receiver in a minimally invasive manner (i.e., in a manner that seeks to avoid opening the enclosure of a monitored receiver and that seeks to avoid making a direct metallic connection to the circuitry of the receiver). Such minimally invasive approaches are advantageous because they minimize the chance of damaging a panelist's receiver, and they decrease the time required for installation of equipment within a statistically selected dwelling. A well-known approach to achieving this goal has been the use of local oscillator measurements. For example, Freeman, U.S. Pat. No. 2,892,885, discloses a local oscillator measurement approach in which a signal which is representative of the local oscillator frequency generated by a measured receiver is acquired by a probe or antenna that does not make direct electrical contact with the receiver.

Another known non-invasive approach is that of acquiring a video signal by placing an appropriate antenna or pick-up adjacent a cathode ray tube (CRT) associated with the monitored television receiver. This latter approach is taught by Chan et al., U.S. Pat. No. 5,889,548, which is assigned to the same assignee as is the present invention, and which is incorporated herein in its entirety by reference.

A tuner measurement approach that is also relevant to the present invention, but that heretofore has not been available as a non-invasive measurement of a sampled television, is that of signal injection. Porter, U.S. Pat. No. 4,044,376, discloses a tuning measurement approach in which a characteristic RF signal is injected at the antenna terminals of a measured receiver during the vertical blanking period of the television signal that is being displayed. After sequentially injecting the RF signal at each of the channels to which the receiver could be tuned, the channel that is actually tuned on the television set is identified by making an electrical connection to a video test point and observing when the injected signal appears at the output of the tuner. To avoid interference with the television signal being viewed, Porter injects the signal during the vertical blanking interval. A shortcoming of the Porter approach is that, in a common measurement situation in which two receivers in a sampled dwelling are served by the same cable, a recognition signal injected at the antenna terminals of one of the receivers could also be received at the other receiver where it would generate visible interference if that other receiver was tuned to a different signal source. This problem has been solved by using a directional coupler to isolate the monitored receiver from any other receiver serviced by the same antenna cable.

Another signal injection arrangement, which involves replacing a sampled tuner with one modified by the addition of measurement apparatus, is taught by Mostafa et al., U.S. Pat. No. 5,495,282. In the Mostafa et al. arrangement the characteristic signal is injected, detected, and stripped in a separate apparatus interposed between the external tuner and a television set.

SUMMARY OF THE INVENTION

In accordance with an aspect of the invention, a method is provided for determining whether a signal of a program tuned by a tuner of a receiver is being output by an output device of the receiver. The method comprises the steps of: radiating an intermediate frequency recognition signal from an intermediate frequency probe disposed adjacent the tuner of the receiver; developing a representation of a signal output by the output device of the receiver with an output probe and examining a representation of a signal output by the output device of the receiver to determine if the recognition signal is present in the signal.

In some embodiments, the method also includes the steps of: detecting a second signal output by the output device of the receiver; and determining a time interval corresponding to a non-viewable portion of the second signal by examining a representation of the second signal. In such embodiments, the step of radiating an intermediate frequency recognition signal is performed during the time interval determined from the second signal. In some such embodiments, the time interval corresponds to an overscan region of a viewable picture on the output device, and/or the representation of the second signal comprises the second signal.

In some embodiments, the representation of the signal comprises the signal.

In some embodiments, the intermediate frequency recognition signal is radiated at a predetermined frequency offset from a tuned frequency by less than a width of a broadcast television channel.

Optionally, the output device is a display device and the representation of the signal is acquired from a video probe disposed adjacent the display device.

In some embodiments, the method also includes the steps of: developing a representation of a tuned intermediate frequency signal radiated by the tuner by parasitically detecting the tuned intermediate frequency signal with the intermediate frequency probe; obtaining a representation of a direct input signal; and comparing the direct input signal representation with the signal representation developed by the output probe, and comparing the tuned intermediate frequency signal representation with the signal representation developed by the output probe to determine whether the signal displayed on the output device is the tuned intermediate frequency signal or the direct input signal.

In accordance with another aspect of the invention, an apparatus is provided for determining if a signal output by a receiver having a plurality of local inputs was tuned by a tuner of the receiver. The apparatus includes an intermediate frequency probe disposed in proximity to the tuner of the receiver to receive an intermediate frequency signal radiated by the tuner. It also includes a demodulator in communication with the intermediate frequency probe to demodulate the intermediate frequency signal received from the intermediate frequency probe to develop a first test signal. Additionally, the apparatus is provided with an output probe located to develop a second test signal representative of the signal output by the receiver; and a comparison circuit for comparing the first and second test signals to determine if the signal output by the receiver was tuned by the tuner.

In some embodiments, the output probe comprises a video probe disposed in proximity to a display device of the receiver and the second test signal comprises a video signal.

In some embodiments, the apparatus also includes an intermediate frequency signal generating circuit in communication with the probe to selectively radiate a recognition signal from the intermediate frequency probe. In some such embodiments, the apparatus is further provided with an injected signal detector in communication with the output probe for examining the second test signal developed by the output probe for the presence of the intermediate frequency signal.

In some embodiments, the output probe comprises a microphone and the second test signal comprises an audio signal.

In some embodiments, the comparison circuit comprises a decoder for decoding a first ancillary coded message from the first test signal and for decoding a second ancillary coded message from the second test signal; and a logic circuit for comparing the first and the second ancillary coded messages.

In some embodiments, the comparison circuit comprises a program signal extractor for extracting a first program signature from the first test signal and for extracting a second program signature from the second test signal; and a logic circuit for comparing the first and the second program signatures.

In some embodiments, the comparison circuit compares a representation of a direct input signal from at least one of the local inputs with the second test signal to determine if the signal output by the receiver originated at the at least one of the radio frequency inputs. In some such embodiments, the apparatus also includes a library of program signatures and the comparison circuit compares a program signature of at least one of the first test signal, the second test signal and the representation of the direct input signal to at least one signature stored in the library to identify a program associated with the signal output by the receiver.

In accordance with another aspect of the invention, a combination of a broadcast audience measurement circuit for monitoring programs output by a receiver and an intermediate frequency probe for acquiring a replica of a signal tuned by a tuner of the monitored receiver is disclosed. The intermediate frequency probe of the combination includes a wire loop; a capacitor attached across the wire loop so as to form a circuit element tuned to the intermediate frequency of a monitored receiver; and a shielded coaxial cable having a first end coupled to the wire loop and a second end which is adapted to connect to an intermediate frequency signal processing circuit. The intermediate frequency probe also includes means for attaching the probe to an external surface of the monitored receiver in proximity to the tuner.

In some embodiments, an outer conductor portion of the coaxial cable comprises a direct metallic connection to a reference electrical ground of the monitored receiver, and the intermediate frequency probe has no other direct metallic connection to the monitored receiver.

Other features and advantages are inherent in the apparatus claimed and disclosed or will become apparent to those skilled in the art from the following detailed description and its accompanying drawings.

DESCRIPTION OF THE PREFERRED EMBODIMENTS

Figure 1:
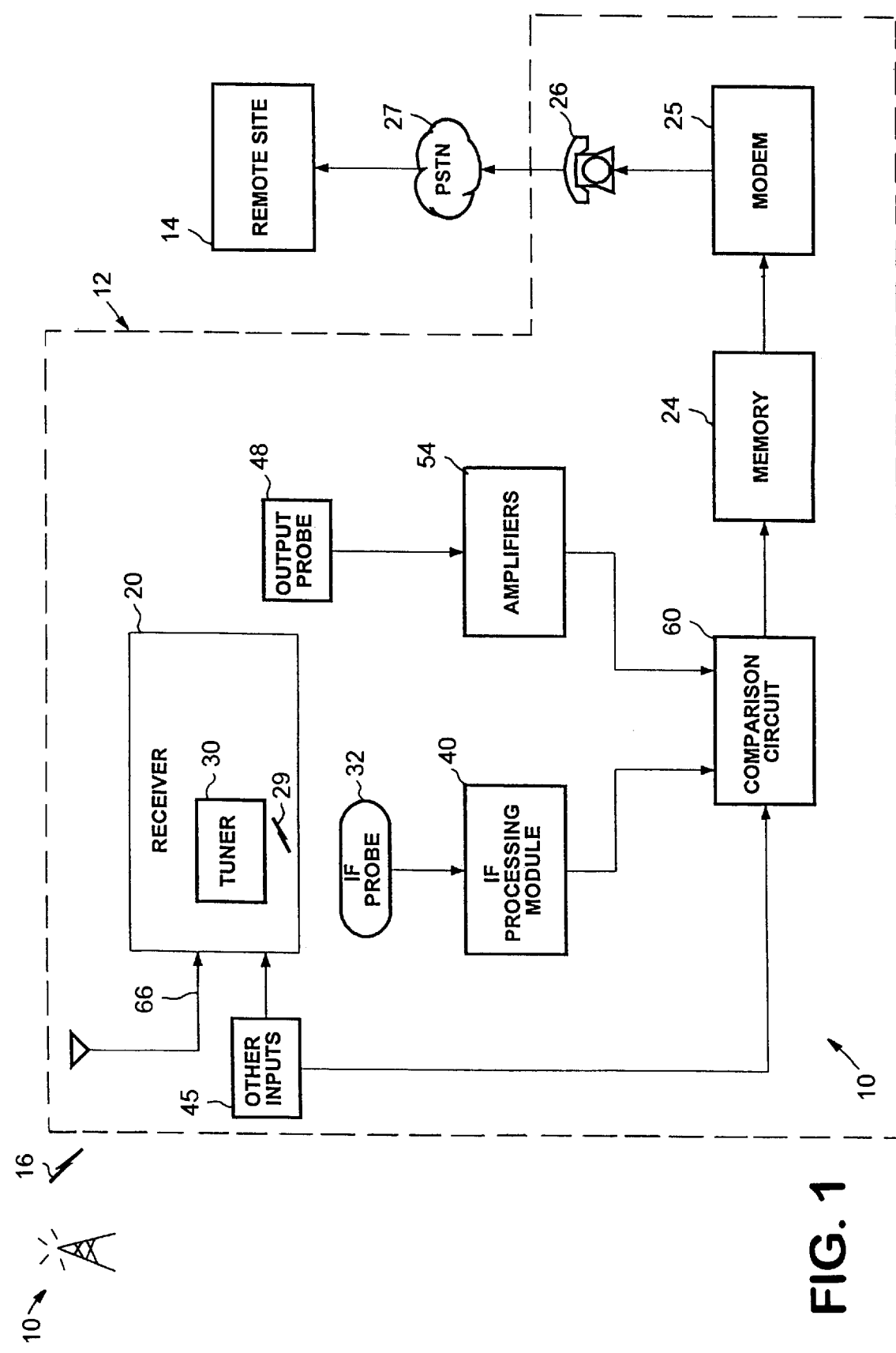
FIG. 1 is a schematic illustration of an apparatus constructed in accordance with the teachings of the instant invention.

An apparatus 10 constructed in accordance with the teachings of the invention is shown generally in FIG. 1 in an exemplary environment of use; namely, in an audience measurement system. While the following description focuses on use of the apparatus 10 within an audience measurement system, persons of ordinary skill in the art will readily appreciate that, unless otherwise indicated, the teachings of the invention are in no way limited to any particular environment of use. On the contrary, the teachings of the invention may be utilized in any application which would benefit from the advantages they offer.

In FIG. 1, the apparatus 10 is shown located in, one of a plurality of locations or dwellings 12 that have been statistically selected, such that, when the program selection activities of the audience members of the plurality of locations 12 are compiled, accurate information about the demographic composition and size of the viewing audience(s) of the program(s) broadcast in a selected time period and geographic area can be ascertained. As is well known, a relatively large number of such statistically selected dwellings 12 are monitored to ensure the accuracy of the compiled data. To this end, each of the dwellings 12 is provided with an in-home unit which monitors the programs selected by the audience in their associated dwelling 12 and periodically forwards the data developed by the monitoring process to a remotely located, central data collection office 14.

More specifically, as shown in FIG. 1, RF program signals 16 broadcast by a broadcasting source 18 (which may be any of a variety of known sources including, by way of example, not limitation, the terrestrial broadcasting antenna shown in FIG. 1) are received in a statistically selected dwelling 12 by one or more items of consumer receiving equipment 20 (e.g., a television receiver, a cable converter, an audio receiver, a low noise block associated with a satellite dish, or other known signal receiving apparatus). All the programs selected for viewing or listening within the dwelling 12 are identified by the in-home unit of the audience measurement system. The program identification data is then stored in a local memory 24 for periodic transmission (e.g., by means of a modem 25, a telephone 26 and the public switched telephone network 27) to the central data collection office 14 where data from a plurality of locations 12 are composited for the purpose of generating program rating information.

Figure 2:
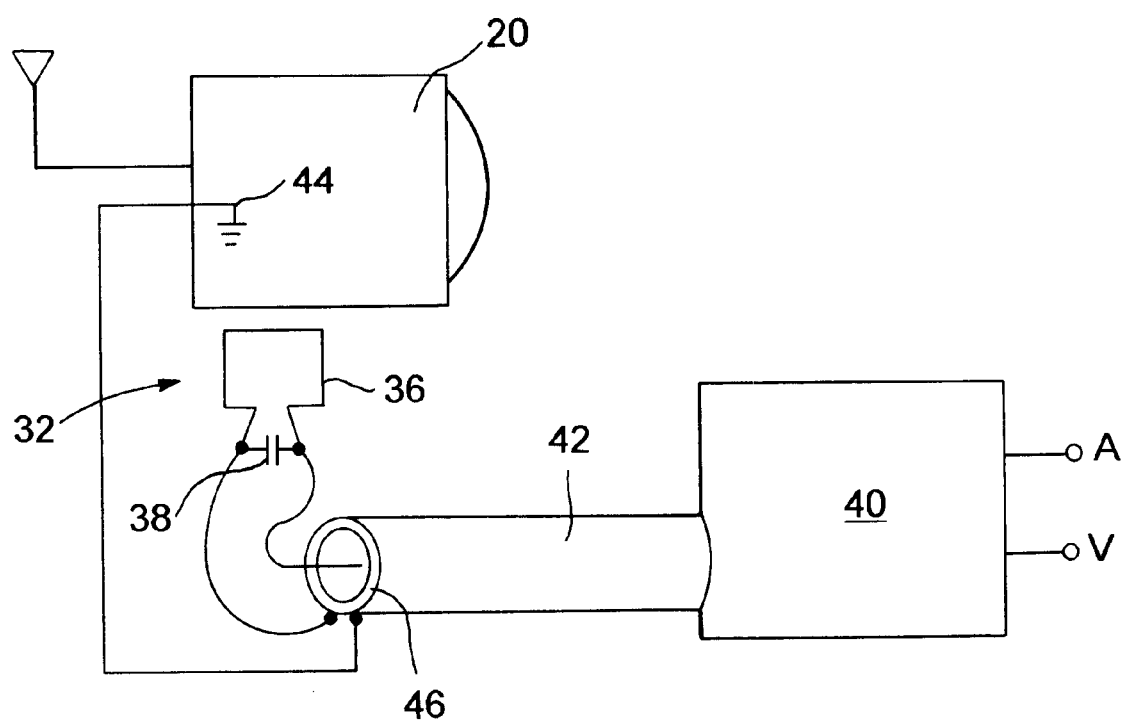
FIG. 2 is a schematic illustration of an Intermediate Frequency ("I.F.") probe used in the apparatus of FIG. 1.

For the purpose of detecting I.F. signals 29 which are parasitically radiated from a tuner 30 of the receiver 20, the apparatus 10 is provided with an I.F. probe 32 such as an antenna or pick-up. The I.F. probe 32 is non-invasively disposed adjacent the monitored receiver 20 in a location selected so as to maximize the strength of the I.F. signals received by the probe 32. As shown in FIG. 2, the probe 32 is preferably implemented by a flat, and generally square, conductor loop 36 that is approximately thirty millimeters on a side. This size is chosen based upon the wavelength of a conventional I.F. frequency (usually forty five MHZ). The probe 32 is "non-invasive" in that it does not require electrical connection with the circuitry of the receiver 20 and does not require opening of, or intrusion into, the housing of the receiver 20 during the installation procedure. To tune the probe 32 to the intermediate frequency of the monitored receiver 20, a capacitor 38 is attached across the wire loop 36 so as to form a tuned LC element. The flat loop 36 may be held in its optimal position by any convenient attachment means, such as a conventional adhesive used to secure the probe 32 onto an exterior surface of the monitored receiver 20.

In some cases, when monitoring a receiver 20 that radiates a relatively large amount of noise at frequencies near the tuned I.P. frequency, the installer may employ an alternate, de-tuned, version of the probe 32. The de-tuned probe 32 preferably comprises a generally elliptical wire loop having a major axis of approximately ten to twenty millimeters in length. Because this de-tuned pick-up is less sensitive to both the desired signal and to the noise, it needs a higher signal level and is generally installed closer to the tuner 30 (e.g., by being inserted through a ventilation slot in the housing of the receiver 20).

As shown in FIG. 2, the wire loop 36 of the I.F. probe 32 is preferably coupled to an end of a shielded cable 42. The opposite end of the cable 42 is coupled to an I.F. signal processing module 40 which is discussed in further detail below. In general, the highest signal to noise ratio at the output of the cable 42 is obtained if a ground point 44 of the receiver 20 (e.g., a ground connection provided by the manufacturer of the receiver at the RF input to the receiver 20), the outer conductor 46 of the cable 42 and the case of the I. F. signal processing module 40 are electrically connected together. When such connection is performed, the probe 32 is best described as being minimally invasive. However, experiments indicate that the highest signal to noise ratio is not always needed. In cases where this is true, the installer may elect to simplify the installation procedure by omitting the ground connection thereby rendering the probe 32 truly "non-invasive".

For the purpose of developing signals representative of the intermediate frequency signals radiated by the tuner 30, the apparatus is further provided with the previously mentioned I.F. signal processing module 40. The specific construction of the I.F. signal processing module 40 is selected based on whether it is intended to be used with a conventional analog television signal (e.g., one adhering to any of the NTSC, PAL, SECAM, etc. standards) or with a digital television signal (e.g., one adhering to the ATSC standard). Examples of I.F. processing modules 40 for either application are given below. In either event, the module 40 is preferably adapted to develop video and/or audio output signals which are representative of the intermediate frequency signal detected by the intermediate frequency probe 32.

Figure 3:
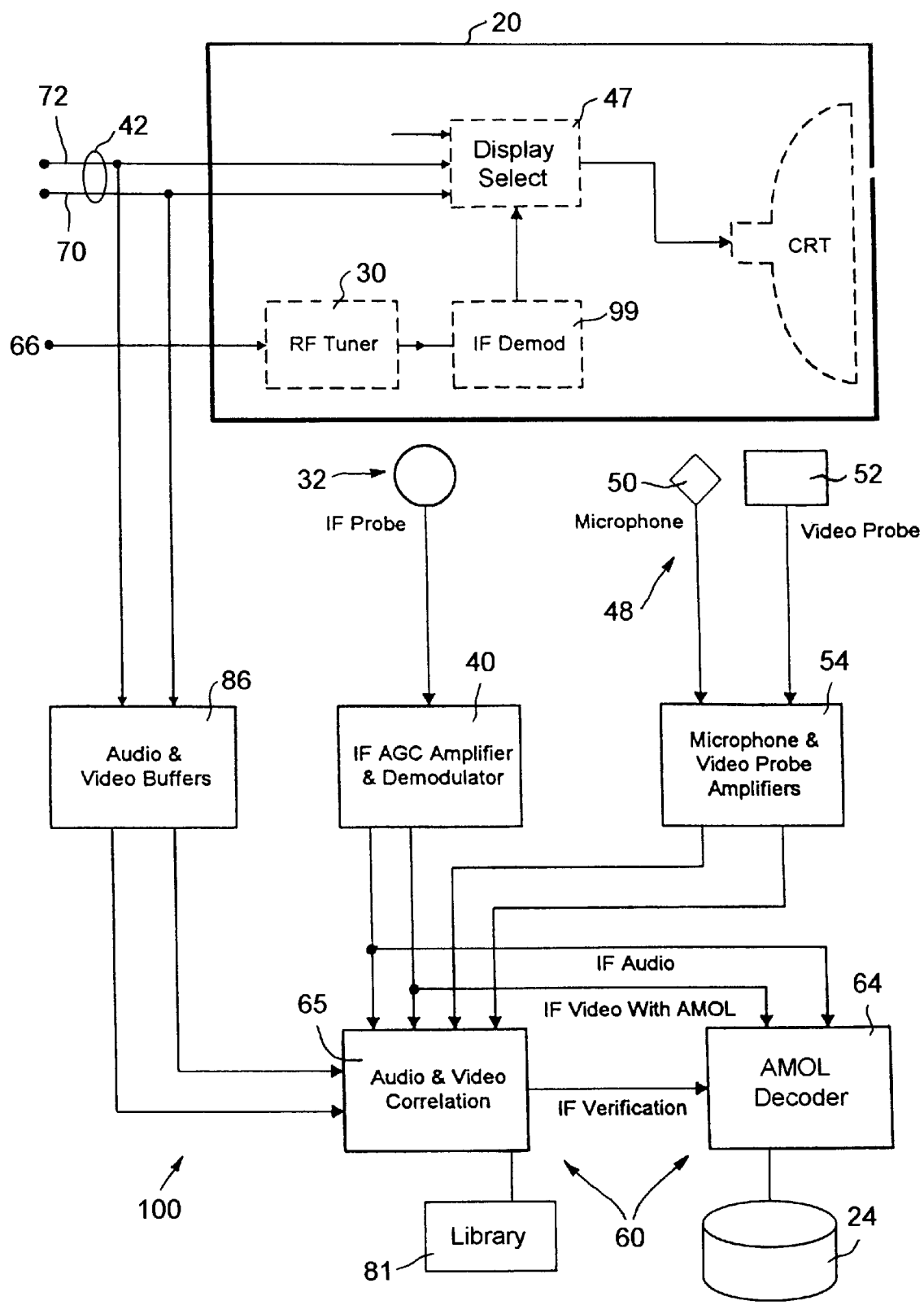
FIG. 3 is a more detailed schematic illustration of the apparatus of FIG. 1.

Persons of ordinary skill in the art will appreciate that modern day consumer receivers 20 often include multiple baseband inputs 45. For example, a television receiver is typically provided with inputs to receive broadcast signals from an antenna and/or a cable converter. Such television receivers also usually include baseband inputs 45 for receiving pre-recorded signals such as signals from a video tape player and/or signals from a DVD player. The availability of these various signal sources-has complicated the audience measurement task in that the signals tuned by the tuner 30 may not actually be displayed on the display device (CRT of the television. Instead, as shown in FIG. 3, an audience controlled display select circuit 47 located downstream of the tuner 30 determines which of the received signals will actually be displayed on the CRT. Therefore, identifying the program associated with the signal 29 detected by the I.F. probe 32 provides no information as to whether the tuned program is actually being viewed.

To address this issue, the apparatus 10 is provided with an output probe 48. As shown in FIG. 1, the output probe 48 is located in proximity to the output of the receiver 20 and operates to develop a test signal which is representative of the signal output by the receiver 20. As will be appreciated by persons of ordinary skill in the art, the art of audience measurement is replete with measurement arrangements that identify a program from either an audio or a video replica of that program signal. Thus, to adapt the apparatus 10 to use with such known techniques, the output probe 48 may be implemented by a microphone 50 and/or a video probe 52 (FIG. 3). Although preferably the apparatus 10 includes both a microphone 50 and a video probe 52, it will be appreciated that the apparatus 10 may be simplified by monitoring only either audio signals or only video signals without departing from the scope or spirit of the invention. For example, the apparatus 10 could be applied to measuring radio audiences by using an I.F. module 40 that provides only an audio output.

To condition the signals developed by the output probe 48 for further processing, the apparatus 10 is preferably provided with audio and video amplifiers 54 as shown in FIG. 1. Although the amplifiers 54 are preferably implemented by op-amps sold by Analog Devices under part number OP275, persons of ordinary skill in the art will readily appreciate that any conventional amplifier(s) may be implemented in these roles without departing from the scope or spirit of the invention. Additionally, persons of ordinary skill in the art will readily appreciate that filter circuits such as bandpass filters (as are used in the presently preferred implementation) can be used to remove noise from the amplified signals without departing from the scope or the spirit of the invention.

As mentioned above, in the presently preferred embodiment, the output probe 48 actually comprises an audio probe 50 and a video probe 52. Thus, the I.F. processing module 40 is preferably adapted to develop both audio and video signals from the intermediate frequency signal 29 detected by the I.F. probe 32. As shown in FIG. 1, the video and audio signals output by the I.F. signal processing module 40 and the audio and video signals developed by the output probes 48 are input to a comparison circuit 60. The comparison circuit 60 compares the test signal(s) received from the I.F. probe 32 to the test signal(s) received from the output probe 48. If the signals match, the apparatus 10 determines that the user is viewing the signal output by the tuner 30.

Once it is determined that a tuned program: has been selected, it is typically desirable to identify which of the possible tuned programs is being viewed (e.g., whether a program on channel 2 or a program on channel 5 is being viewed). Because both video and audio signals are available in the preferred embodiment, persons of ordinary skill in the art will appreciate that the comparison circuit 60 can be configured to perform this program identification process in many different ways. For example, the comparison circuit 60 could include an audio and/or a video decoder used to read ancillary coded identification messages transmitted with the program signal to identify the selected program and to confirm that the program and/or a commercial advertisement was, in fact, broadcast. Alternatively, the comparison circuit 60 could include a program signature extraction and logic circuit for extracting characteristic audio and/or video signatures from the representation of the program signal output by the receiver 20 and for comparing the extracted signatures (or for supplying the signatures to another portion of the system that makes the actual comparisons) with signatures representative of known program elements to positively identify the selected program.

It will be noted that the foregoing arrangement provides two means (i.e., the I.P. probe 32 and the output probe 48) of acquiring a test signal which is representative of a signal that may-include one or more ancillary codes, such as the well known AMOL code, that can be used to identify the originator or broadcast source of the signal. Broadcast audience measurement methods using ancillary codes are taught, inter aria, by Thomas et al., U.S. Pat. No. 5,425,100, which is incorporated herein by reference in its entirety. To utilize the presence of these codes, the comparison circuit 60 may optionally comprise a suitable decoder 64 (e.g., an AMOL decoder) as shown in FIG. 3 to decode whatever ancillary code is found in the output of the I.F. probe 32. The decoded code can then be stored in the local memory 24 for subsequent transmission to the data collection central office 14 as explained above. It will be appreciated by persons of ordinary skill in the art that AMOL and other vertical blanking interval codes are conventionally stripped from the video signal before it is sent to the CRT for display. Hence, the output probe 48 is ordinarily not useful for acquiring such codes. However, in situations in which an ancillary code is present in the active video signal (e.g., as a low bandwidth luminance variation), one could alternatively read the code from the test signal developed by the video probe 52 and could, in such cases, accept data from whichever of the two decoding sources (i.e., the I.F. probe 32 and the video probe 52) performed better. In such circumstances, the comparison circuit 60 could optionally decode the ancillary codes in both of the test signals, and compare the ancillary codes from the I.F. probe 32 with the ancillary codes from the output probe 48 in a hardwired or programed logic circuit to determine if the program tuned by the tuner 30 is being output by the receiver 20.

Another apparatus 100 constructed in accordance with the teachings of the invention is shown in FIG. 3. The apparatus 100 is substantially similar to the apparatus 10. Thus, to avoid unnecessary repetition of the descriptions of earlier components, the following description shall focus on the differences between the apparatus 10 and the apparatus 100, and the descriptions of the earlier described elements shall not be repeated. Instead, the interested reader is referred to the above description for a detailed discussion of these common elements. To facilitate this process, like reference numerals will be used for like structures in the description of the apparatus 10, 100.

As with the apparatus 10, the apparatus 100 includes the I.F. probe 32 and the output probe 48. The output probe 48 is implemented by the microphone 50 and the video probe 52. The output probes 50, 52 are coupled to amplifiers 54 which condition the test signals developed by the probes 50, 52 for further processing.

As with the apparatus 10, the test signals (audio and video) developed by the I.F. probe 32 are output to an I.F. processing module 40. As the signals detected by the I.F. probe 32 may vary over a relatively large range, as was the case in the apparatus 10, the I.F. processing module 40 is preferably implemented by two stages, namely, an automatic gain control amplification stage and a demodulation stage. Although persons of ordinary skill in the art will appreciate that many different amplification and/or demodulation techniques could be utilized without departing from the, scope or spirit of the invention, in the preferred embodiments, the amplification stage is implemented by an automatic gain control (AGC) amplifier such as a MOSFET which is commercially available from Siemens under the tradename BF998 and the demodulation stage is implemented by an IF Demodulator which is commercially available from Sharp under the tradename RFIVU5. As shown in FIG. 3, in the apparatus 100, the I.F. processing module 40 develops both audio and video test signals from the output of the probe 32.

As mentioned above, techniques for identifying programs selected by an audience member (e.g., a program displayed on the CRT of a television) by extracting characteristic program feature signatures from the user-selected signal and comparing those signatures with ones of a stored collection of program feature signatures taken from known program signals are known in the art. In the apparatus 100, signature extraction techniques are used to identify which of several inputs 66, 70, 72 is the source of a user-selected signal, to identify the program if the broadcast input 66 has been selected, and to identify the signal as originating from a local source (e.g., an off-air tape recording being played back) if the direct audio 72 and video 70 inputs have been selected.

Specifically, the RF input signal tuned by the tuner 30 is detected with the I.F. probe 32 are explained above. The signal captured by the probe 32 is amplified and demodulated-in the I.F. processing-module 40 and subsequently input to a correlation circuit 65 which forms part of the comparison circuit 60.

In addition, the representations of the signals present on the, direct audio 70 and video 72 inputs (i.e., the local baseband inputs 48) are input to the correlation circuit 65. Preferably, the signals taken from the local inputs 70, 72 are first placed in suitable audio and video buffers 86. These buffers 86 function to introduce controlled signal delays into the local baseband signals to thereby provide more accurate temporal matching of the various signals tested by the correlation circuit 65. Moreover, replicas of the user selected program signals acquired with the video probe 52 and/or the microphone 50 are input to the correlation circuit 65. The correlation circuit 65 includes a logic circuit which compares pairs of the three signals (e.g., the local baseband signals, the signals from the I.F. processing module 40, and the signals from the output probe 48) to identify which of the inputs 66, 70, 72 is supplying the user-selected signal detected by the output probe 48. Such a correlation circuit 65 is fully disclosed in U.S. Pat. No. 5,594,934 and U.S. patent application Ser. No. 08/786,270, which are hereby incorporated by reference. The user-selected input (e.g., the output of probe 48) can then be correlated with signatures from a library 81 of signatures to specifically identify the program output by the receiver 20. It will be appreciated by persons of ordinary skill in the art that in many cases providing a local signature library 81 for identifying recorded signals (e.g., videotape signals) is impractical. The in-home portion of the measurement system may, therefore, store unknown signatures for subsequent transmission to a central office 14, where the identification can be carried out with reference to a full library (not shown), as is taught by Kiewit et al., U.S. Pat. No. 4,697,209, which is incorporated herein by reference. Additionally, it will be appreciated that once two signatures are matched by the correlation circuit 65, either of these signatures can be selected for further use by the system. For example, if the signal acquired by the I.F. probe 32 is of generally higher quality than that output from the video probe 52, then the signature derived from the signal associated with the I.F. probe will preferably be the one that is saved and forwarded to the central office 14 for program identification.

As also shown in FIG. 3, the apparatus 100 may operate with both ancillary codes and derived signatures in a manner similar to that taught by Thomas et al., U.S. Pat. No. 5,481,294, which is incorporated herein by reference. More specifically, the apparatus 100 preferably first attempts to identify a user-selected program signal by reading an identifying code from that signal, and, if that attempt is unsuccessful, compares a characteristic feature signature of that signal with characteristic feature signatures stored in a library of signatures. In other words, if a correlation operation performed by the comparison circuit 60 indicates that the user-selected signal (e.g., the output of the receiver 20) is the one tuned by the tuner 30, and if a signal identifying code can be read from either the output of the I.F. probe 32 or from the output of the output probe 48, then that code is indicative of the current tuning status. If, however, no ancillary code is detected, or the detected code cannot be decoded or recognized, the correlation circuit 65 performs a signature extraction on the signal output by the receiver 20 and attempts-to identify the corresponding program by comparing the extracted signature to signatures in the library 81, or stores the extracted signature in local memory 24 for comparison against a more complete library at remote site 14.

Figure 4:
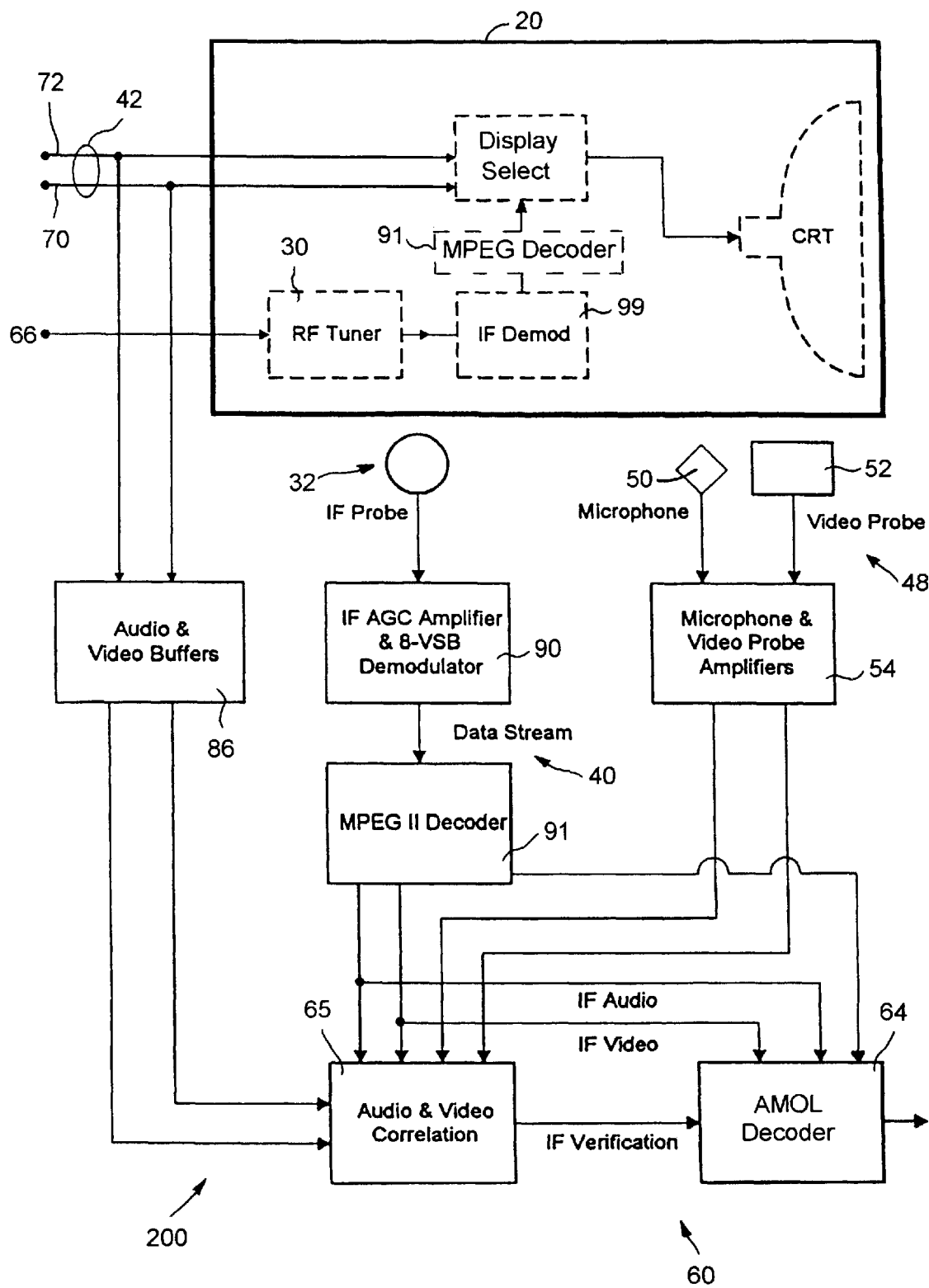
FIG. 4 is a schematic illustration of another apparatus constructed in accordance with the teachings of the invention and adapted for use with a digital television receiver.

In the near future, television broadcasting is scheduled to change over to a digital signal format in which one or more user-selectable program signals, each encoded as a sequence of MPEG II data packets, is transmitted in each television channel. The teachings of the present invention are readily applicable to this new signal format. An apparatus 200 constructed in accordance with the teachings of the invention and adapted for use in the digital broadcasting environment is shown in FIG. 4. As shown in FIG. 4, the apparatus 200 shares much of the same structure as the apparatus 10, 100. In the interest of brevity, structures which are identical in the apparatus 10, 100, 200 will not be re-described here. Instead, the interested reader is referred to the description above for a complete discussion of those common structures. To facilitate this process, like reference numerals are used to identify like structures in FIGS. 1, 3 and 4.

In the digital signal context, the audio and video replicas of a user selected signal can be extracted and processed in substantially the same way as is done in the analog broadcasting context described above inasmuch as the output signals (e.g., from a CRT and a speaker) are the same. To this end, the apparatus 200 is provided with-the I.P. probe 32 and the output probe 48 which is implemented by the microphone 50 and the video probe 52 disposed in proximity to the output device(s) of the receiver 20. Unlike the analog environment, in digital broadcast applications the signal acquired by the I.F. probe 32 will be a digital signal; and will have to be demodulated: differently (e.g., by an 8-VSB demodulator 90), and will have to be processed by a MPEG-II decoder 91 in order to develop a test signal that can be used to identify the local signal source and to identify the viewed program via the techniques described above.

Figure 5:
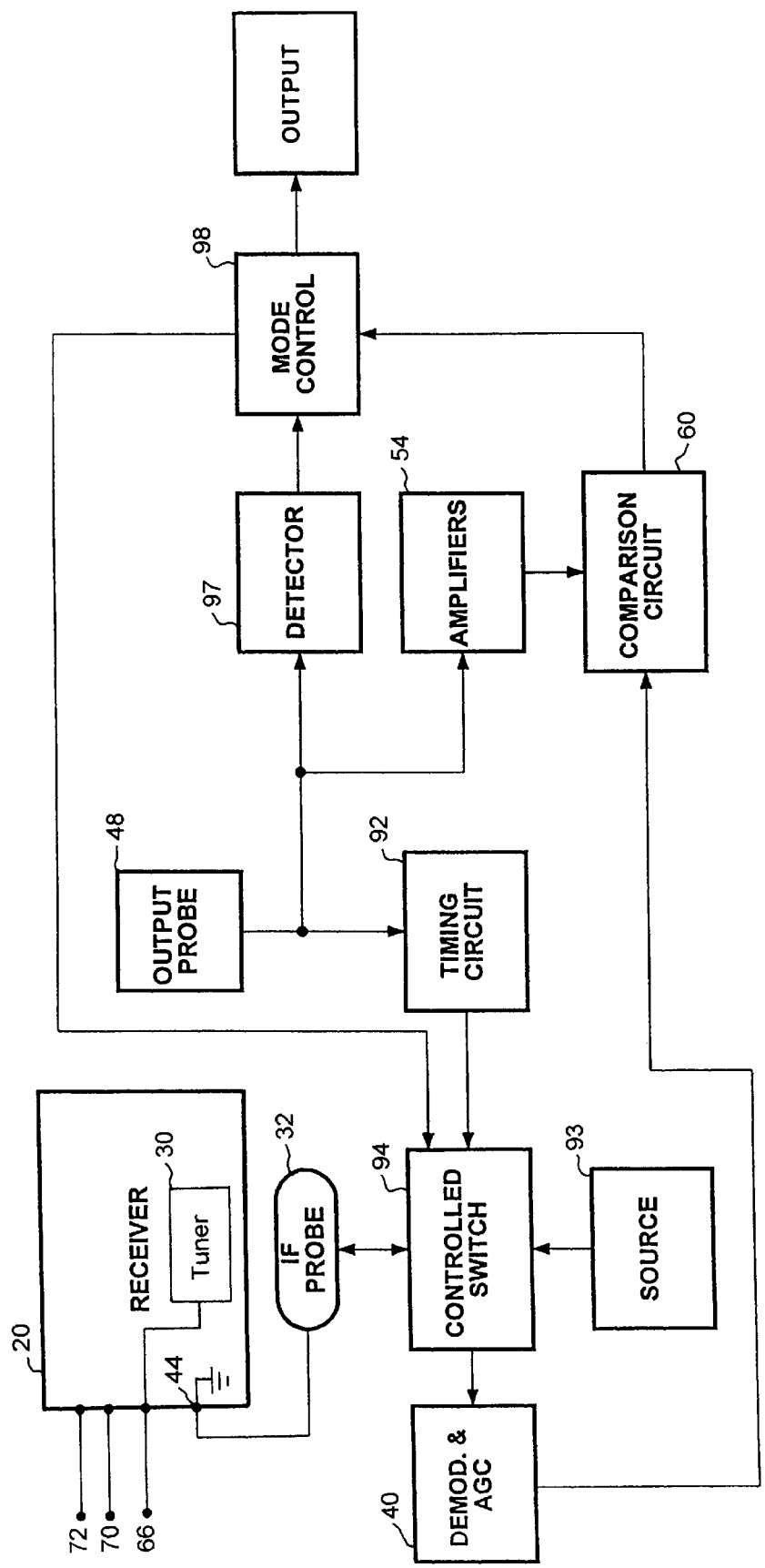
FIG. 5 is a schematic illustration of another apparatus constructed in accordance with the teachings of the invention and useful for identifying the source of an audience selected program via I.F. signal injection.

Another apparatus 300 constructed in accordance with the teachings of the invention is shown in FIG. 5. The apparatus 300 employs many components which are similar to those employed in the apparatus 10, 100, 200 discussed above. Therefore, in the interest of brevity, the following discussion focuses on the components of the apparatus 300 that have not already been described. The interested reader is referred to the above description for a discussion of the previously described components. To facilitate this effort, like reference numerals are used to identify like components in the apparatus 10, 100, 200 and 300.

When used with a conventional analog receiver 20, the I.F. probe 32 can be used to both parasitically detect I.F. signals that are radiated by the tuner 30 of the monitored receiver 20 and to inject an intermediate frequency (I.F.) identification signal or recognition signal into the tuned signal. In the latter instance, the output probe 48 can be used to detect the injected signal as explained below to determine if the injected signal is output by the receiver 20. If the injected recognition signal is output by the-receiver 20, the user has selected the program tuned by the tuner 30 of the receiver 20, not one of the other local inputs 42. In other words, this signal injection arrangement can be employed to determine which of several possible signal sources has been selected by a viewer.

In analog television monitoring applications, the output probe 48 is preferably implemented by a video probe 52. Before the recognition signal is injected, the video probe 52, (which may be a non-invasive probe of the sort taught by Chan et al., U.S. Pat. No. 5,889,548), is used to acquire a replica of the user-selected video signal displayed on the CRT of the receiver 20. That is, the video probe 52 is disposed on the outside surface of the enclosure of the receiver 20 adjacent the CRT. It will be evident to those of ordinary skill in the art that any of the other methods of acquiring a replica of the displayed video signal known in the art (including, by way of example, not limitation, soldering a lead to a test point within the receiver 20) can also be used without departing from the scope or spirit of the invention.

For the purpose of ensuring the injected recognition signal does not interfere with the program viewed by the audience member (i.e., is substantially, and preferably completely, imperceptible to the audience member), the apparatus 300 is provided with a timing circuit 92. As shown in FIG. 5, the timing circuit 92 receives the video signal output of the output probe 48 (either directly from the probe 48 as shown in FIG. 5 or via the video signal amplifier 54). The timing circuit 92, which is preferably implemented by a digital counter, analyzes the video output signal to identify a non-viewable portion thereof during which the recognition signal is injected. The non-viewable portion is preferably at the bottom of the display in an overscan region.

To selectively radiate the recognition signal from the I.F. probe 32, the apparatus 300 is further provided with an I.F. signal generating circuit implemented by the timing circuit 92, a recognition signal source 93 and a controlled switch 94. The recognition signal source 93 is preferably implemented by an oscillator generating a 43.87 MHZ signal. Such an oscillator is commercially available from Fox under the tradename Crystal Oscillator (Part No. F1100E). The controlled switch 94 is implemented by an RF Switch which is commercially available from NEC under the tradename UPG132G.

As shown in FIG. 5, the timing circuit 92 is coupled to the controlled switch 94 and serves to control the state of the switch 94 such that the source 93 is coupled to the I.F. probe 32, and, thus, the probe 32 radiates the I.F. recognition signal at an advantageous time in the displayed video signal. For example, the timing circuit 92 will preferably control the switch 94 such that the recognition signal (e.g., a low-intensity burst) is timed to appear in the last few lines of a video field of the displayed video signal so that the recognition signal appears at the bottom of the display in an overscan region generally not seen by the viewer. The overscan region is the area which is outside the CRT display phosphorous screen. Usually, the last two to five scan lines of the picture are adjusted to fall in this region. That means the bottom edges of the video pictures are not generally seen by the viewer.

The video probe can pick-up a video signal in the overscan area because the video probe senses the electric field radiation from the CRT cathode and its driving circuits, not from the screen.

In order to determine if the recognition signal is present in the signal output by the receiver 20, the apparatus 300 is further provided with an injected signal detector 97. As shown in FIG. 5, the injected signal detector 97 is in communication with the output probe 48 and-functions to examine the test signal developed by the output probe 48 for the recognition signal. Although persons of ordinary skill in the art will readily appreciate that the detector 97 can be implemented in many ways without departing from the scope or spirit of the invention, in the preferred embodiment the detector 97 is implemented by a monolithic multiplier/detector which is commercially available from EXAR under the tradename XR-2228. Similarly, although in FIG. 5, the detector 97 is coupled to the probe 48, in the preferred embodiment, the detector 97 actually receives the output of the probe 48 via the amplifier 54.

Preferably, the recognition signal burst output by the I.F. probe 32 is radiated at a selected frequency which is within the passband of the monitored receiver's I.F. amplifier and which is offset from the I.F. carrier by less than the width of a television broadcast channel. In a preferred embodiment used with a receiver operating in accordance with the NTSC broadcast standard, the recognition signal is radiated at 43.875 MHZ, and is mixed with the I.F. carrier signal (conventionally 45.75 MHz) by the TV's I.F. demodulator (not shown) to produce a 1.875 MHz signal (a frequency selected to be in a low energy portion of the NTSC video spectrum). This recognition signal will not be discerned by the viewer, partly because of its low intensity, and partly because it is preferably injected during several of the last lines in a video frame so that it appears in what is normally an overscan portion of the active video below the bottom of the visible picture. If any one of the channels of television program signals available at the RF input 66 are selected by the viewer, the recognition signal will be picked-up by the video probe 52 and detected by the 1.875 MHz video detector 97. If, on the other hand, the viewed signal is supplied by the direct audio and video inputs 72, 70, no recognition signal is found in the output from the video probe 74.

Although the method of I.F. injection described above is useful in discriminating between tuned broadcast signals and other signals, it does not determine which of a plurality of available broadcast signals has been selected for viewing. To perform program identification, the apparatus 300 must be provided with additional circuitry to implement one or more of the signal correlation and code reading approaches discussed above. To this end, as shown in FIG. 5, the apparatus 300 is provided with an I.F. processing module 40 (which includes an automatic gain control amplifier and a demodulator as explained above), a comparison circuit 60, and a mode control logic circuit 98. More specifically, the I.F. processing module 40 is coupled to the controlled switch 94 such that, when the controlled switch 94 does not connect the source 93 to the I.F. probe 32 (e.g., no signal injection is occurring), the controlled switch 94 couples the I.F. processing module 40 to the I.F. probe 32. As a result, when the I.F. probe 32 is not being used for injection, it is available for and used to parasitically detect I.F. signals radiated by the tuner 30.

To control the mode of the I.F. probe 32 (i.e., injection or detection), the apparatus 300 is further provided with a mode control circuit 98. The mode control circuit 98 is preferably implemented by a programmed microprocessor such as the microprocessor sold by Microchip under the tradename Microcontroller with part no. PIC 16/17. The mode control circuit 98 sends control signals to the controlled switch 94 to cause the switch to ignore or respond to the output signals of the timing circuit 92 depending upon the desired mode of operation. However, persons of ordinary skill in the art will appreciate that, instead of communicating with the controlled switch 94, the mode control circuit 92 could communicate with the timing circuit 92 to selectively activate and deactivate the timing circuit 92 depending on the desired mode of operation. As also shown in FIG. 5, the mode control circuit 98 determines whether the output of the detector 97 or the output of the comparison circuit 60 is the output of the apparatus 300.

Persons of ordinary skill in the art will appreciate that any of the above described program identification techniques, as well as other techniques, can be performed by the comparison circuit 60 without departing from the scope or spirit of the invention. In addition, persons of ordinary skill in the art will appreciate that the buffers 86 of FIGS. 3 and 4 can be employed with the apparatus 300 to delay delivery of signals representative of the local inputs 70, 72 to the comparison circuit 60 without departing from the scope or spirit of the invention.

Although I.F. injection is useful for identifying a tuned analog TV signal, it is expected to be less applicable to digital TV broadcast measurement. As is known in the art, the ATSC digital broadcast standard calls for the use of encoding and decoding arrangements chosen to minimize signal degradation caused by noise impulses. Specifically, the ATSC digital broadcast approach makes it likely that a noise impulse will degrade only a single bit of a transmitted byte of information, rather than a complete byte. The use of the ATSC, or other such arrangements, indicates that if one were to inject a recognition signal into a receiver circuit at a location between the RF tuner 30 and the IF demodulator 99 (See FIG. 4), that signal would be treated as a noise impulse and would be effectively stripped by the demodulation and decoding circuitry. As a result, injected I.F. signals will not reach the output of the receiver 20.

From the foregoing, persons of ordinary skill in the art will appreciate that the disclosed non-invasive or minimally invasive intermediate frequency (I.F.) probe 32 can be used both to acquire a replica of a tuned signal and to inject a recognition signal into a tuned signal. Moreover, the disclosed I.F. probe 32 and its accompanying circuitry can be configured for use with either analog (e.g., NTSC, PAL or SECAM) or digital (e.g., ATSC) television broadcasts.

From the foregoing, persons or ordinary skill in the art will further appreciate that the disclosed I.F. probe 32 is configured for a minimally invasive installation in order to both simplify the installation process and to minimize the risk of damaging the monitored receiver. At most one direct metallic electrical connection is made to the monitored receiver 20, with that single connection acting to provide a reference electrical ground.

Although certain embodiments of the teachings of the invention have been described herein, the scope of coverage of this patent is not limited thereto. On the contrary, this patent covers all instantiations of the teachings of the invention fairly falling within the scope of the appended claims either literally or under the doctrine of equivalents.

What is claimed is:

1. A method for determining whether a signal of a program tuned by a tuner of a receiver is being output by an output device of the receiver, the method comprising the steps of:
    radiating an intermediate frequency recognition signal from an intermediate frequency probe disposed adjacent the tuner of the receiver;
    developing a representation of a signal output by the output device of the receiver with an output probe; and
    examining the representation of the signal output by the output device of the receiver to determine if the recognition signal is present in the signal.

2. A method as defined in claim 1 further comprising the steps of:
    detecting a second signal output by the output device of the receiver; and
    determining a time interval corresponding to a non-viewable portion of the second signal by examining a representation of the second signal;
    wherein the step of radiating an intermediate frequency recognition signal is performed during the time interval determined from the second signal.

3. A method as defined in claim 2 wherein the time interval corresponds to an overscan region of a viewable picture on the output device.

4. A method as defined in claim 2 wherein the representation of the second signal comprises the second signal.

5. A method as defined in claim 1 wherein the representation of the signal comprises the signal.

6. A method as defined in claim 1 wherein the intermediate frequency recognition signal is radiated at a predetermined frequency offset from a tuned frequency by less than a width of a broadcast television channel.

7. A method as defined in claim 1 wherein the output device is a display device and the representation of the signal is acquired from a video probe disposed adjacent the display device.

8. A method as defined in claim 1 further comprising the steps of:
    developing a representation of a tuned intermediate frequency signal radiated by the tuner by parasitically detecting the tuned intermediate frequency signal with the intermediate frequency probe;
    obtaining a representation of a direct input signal; and
    comparing the direct input signal representation with the signal representation developed by the output probe, and comparing the tuned intermediate frequency signal representation with the signal representation developed by the output probe to determine whether the signal displayed on the output device is the tuned intermediate frequency signal or the direct input signal.

9. An apparatus for determining if a signal output by a receiver having a plurality of local inputs was tuned by a tuner of the receiver, the apparatus comprising:
    an intermediate frequency probe disposed in proximity to the tuner of the receiver to receive an intermediate frequency signal radiated by the tuner;
    a demodulator in communication with the intermediate frequency probe to demodulate the intermediate frequency signal received from the intermediate frequency probe to develop a first test signal;
    an output probe located to develop a second test signal representative of the signal output by the receiver; and
    a comparison circuit for comparing the first and second test signals to determine if the signal output by the receiver was tuned by the tuner.

10. An apparatus as defined in claim 9 wherein the output probe comprises a video probe disposed in proximity to a display device of the receiver and wherein the second test signal comprises a video signal.

11. An apparatus as defined in claim 10 further comprising an intermediate frequency signal generating circuit in communication with the probe to selectively radiate a recognition signal from the intermediate frequency probe.

12. An apparatus as defined in claim 11 further comprising an injected signal detector in communication with the output probe for examining the second test signal developed by the output probe for the presence of the intermediate frequency signal.

13. An apparatus as defined in claim 9 wherein the output probe comprises a microphone and wherein the second test signal comprises an audio signal.

14. An apparatus as defined in claim 9 wherein the comparison circuit comprises:
    a decoder for decoding a first ancillary coded message from the first test signal and for decoding a second ancillary coded message from the second test signal; and
    a logic circuit for comparing the first and the second ancillary coded messages.

15. An apparatus as defined in claim 9 wherein the comparison circuit comprises:
    a program signal extractor for extracting a first program signature from the first test signal and for extracting a second program signature from the second test signal; and a logic circuit for comparing the first and the second program signatures.

16. An apparatus as defined in claim 9 further comprising an intermediate frequency signal generating circuit in communication with the probe to selectively radiate a recognition signal from the intermediate frequency probe.

17. An apparatus as defined in claim 16 further comprising an injected signal detector in communication with the output probe for examining the second test signal developed by the output probe for the presence of the intermediate frequency signal.

18. An apparatus as defined in claim 9 wherein the comparison circuit compares a representation of a direct input signal from at least one of the local inputs with the second test signal to determine if the signal output by the receiver originated at the at least one of the local inputs.

19. An apparatus as defined in claim 18 further comprising a library of program signatures and wherein the comparison circuit compares a program signature of at least one of the first test signal, the second test signal and the representation of the direct input signal to at least one signature stored in the library to identify a program associated with the signal output by the receiver.

20. An apparatus as defined in claim 9 further comprising a library of program signatures and wherein the comparison circuit compares a program signature of at least one of the first test signal and the second test signal to at least one signature stored in the library to identify a program associated with the signal output by the receiver.

21. In combination,
   a broadcast audience measurement circuit for monitoring programs output by a receiver; and
   an intermediate frequency probe for acquiring a replica of a signal tuned by a tuner of the monitored receiver, the intermediate frequency probe comprising:
   a wire loop;
   a capacitor attached across the wire-loop so as to form a circuit element tuned to the intermediate frequency of a monitored receiver;
   a shielded coaxial cable having a first end coupled to the wire loop and a second end which is adapted to connect to an intermediate frequency signal processing circuit; and
   means for attaching the probe to an external surface of the monitored receiver in proximity to the tuner.

22. A combination as defined in claim 21 wherein an outer conductor portion of the coaxial cable comprises a direct metallic connection to a reference electrical ground of the monitored receiver, the intermediate frequency probe having no other direct metallic connection to the monitored receiver.

23. A combination as defined in claim 21 wherein the broadcast audience measurement circuit further comprises an intermediate frequency signal generating circuit in communication with the intermediate frequency probe to selectively radiate a recognition signal from the intermediate frequency probe.

24. An apparatus as defined in claim 23 wherein the broadcast audience measurement circuit further comprises:
   an output probe located to develop a test signal representative of a signal output by the receiver; and
   an injected signal detector in communication with the output probe for examining the test signal developed by the output probe for the presence of the intermediate frequency signal.

* * * * *